United States Patent
Norman et al.

(10) Patent No.: US 7,171,525 B1
(45) Date of Patent: Jan. 30, 2007

(54) METHOD AND SYSTEM FOR ARBITRATING PRIORITY BIDS SENT OVER SERIAL LINKS TO A MULTI-PORT STORAGE DEVICE

(75) Inventors: Robert D. Norman, Blaine, WA (US); Frank Sai-Keung Lee, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 406 days.

(21) Appl. No.: 10/210,839

(22) Filed: Jul. 31, 2002

(51) Int. Cl.
   *G06F 12/00* (2006.01)
(52) U.S. Cl. .................................. 711/150; 711/149
(58) Field of Classification Search ................ 711/149, 711/150
   See application file for complete search history.

(56) References Cited

U.S. PATENT DOCUMENTS

| | | | |
|---|---|---|---|
| 4,637,012 A * | 1/1987 | Crabbe, Jr. ................. | 370/276 |
| 4,796,232 A * | 1/1989 | House .................... | 365/189.03 |
| 4,818,985 A * | 4/1989 | Ikeda ...................... | 340/825.5 |
| 4,937,781 A * | 6/1990 | Lee et al. ................... | 711/149 |
| 5,038,274 A * | 8/1991 | Nielsen ..................... | 710/121 |
| 5,235,689 A * | 8/1993 | Baker et al. ................ | 710/305 |
| 5,276,842 A * | 1/1994 | Sugita ....................... | 711/149 |
| 5,506,977 A * | 4/1996 | Jones ........................ | 711/155 |
| 5,526,494 A * | 6/1996 | Iino et al. .................. | 710/119 |
| 5,535,339 A * | 7/1996 | Kim .......................... | 710/100 |
| 5,583,872 A * | 12/1996 | Albrecht et al. ............ | 370/476 |
| 5,610,808 A * | 3/1997 | Squires et al. ............. | 700/2 |
| 5,664,145 A * | 9/1997 | Apperley et al. ........... | 711/117 |
| 5,729,702 A * | 3/1998 | Creedon et al. ............ | 710/111 |

(Continued)

FOREIGN PATENT DOCUMENTS

WO    WO 99/26137    *    5/1999

OTHER PUBLICATIONS

APT Technologies, Inc., et al., "*Serial ATA: High Speed Serialized AT Attachment*", Revision 1.0, Aug. 29, 2001, pp. 1-267.

(Continued)

*Primary Examiner*—Matthew Kim
*Assistant Examiner*—Sheng-Jen Tsai
(74) *Attorney, Agent, or Firm*—Girard & Equitz LLP

(57) ABSTRACT

A system including a multi-port storage device (e.g., a disk drive) and at least two users, each user coupled to a port of the storage device by a serial link. The storage device has an operational portion and an interface (including arbitration circuitry) between its ports and the operational portion. In response to a set of competing priority bids from the users, the arbitration circuitry grants one bid (including by sending an acknowledgement to the successful bidder) and preferably holds each non-granted competing bid without sending any notification to the unsuccessful bidder until the successful bidder sends a deselect signal. The system can be a RAID system including at least two disk drives and at least two controllers, where at least one drive is a multi-port device shared by at least two of the controllers. Preferably, each priority bid and deselect signal is a primitive code (e.g., an ordered sequence of a 10-bit control character and three 10-bit data characters in SATA format). Other aspects of the invention are multi-port storage devices and users for use in such a system.

1 Claim, 5 Drawing Sheets

U.S. PATENT DOCUMENTS

| | | | | |
|---|---|---|---|---|
| 5,764,924 | A * | 6/1998 | Hong | 710/300 |
| 5,768,211 | A * | 6/1998 | Jones et al. | 365/230.05 |
| 5,812,754 | A * | 9/1998 | Lui et al. | 714/6 |
| 5,952,936 | A * | 9/1999 | Enomoto | 340/825.69 |
| 5,958,064 | A * | 9/1999 | Judd et al. | 714/4 |
| 6,032,216 | A * | 2/2000 | Schmuck et al. | 710/200 |
| 6,122,706 | A * | 9/2000 | Leong et al. | 711/108 |
| 6,282,469 | B1 * | 8/2001 | Rogers et al. | 701/29 |
| 6,321,309 | B1 * | 11/2001 | Bell et al. | 711/150 |
| 6,408,358 | B1 * | 6/2002 | Uchiyama et al. | 711/114 |
| 6,421,760 | B1 * | 7/2002 | McDonald et al. | 711/114 |
| 6,601,134 | B1 * | 7/2003 | Yamagami et al. | 711/111 |
| 6,895,455 | B1 * | 5/2005 | Rothberg | 710/74 |
| 2002/0041650 | A1 * | 4/2002 | Richmond | 375/372 |
| 2002/0095637 | A1 * | 7/2002 | Gaultier | 714/748 |
| 2003/0140201 | A1 * | 7/2003 | Takizawa | 711/151 |

OTHER PUBLICATIONS

Weber, Ralph O., editor, "*Information Technology—SCSI Architecture Model—2 (SAM-2)*", T10 Projected 1157-D, Revision 23, Mar. 16, 2002, pp. 1-118.

Elliott, Robert C., editior, "*Information Technology—Serial Attached SCSI (SAS)*", T10 Project 1562-D, Revision 0d, Jul. 8, 2002, pp. 1-248.

* cited by examiner

METHOD AND SYSTEM FOR ARBITRATING PRIORITY BIDS SENT OVER SERIAL LINKS TO A MULTI-PORT STORAGE DEVICE

TECHNICAL FIELD OF THE INVENTION

The invention pertains to device access methods and systems in which a multi-port disk drive (and other multi-port storage device) arbitrates among device access bids from controllers or other users, each user coupled to a port of the storage device by a serial link. The invention also pertains to multi-port storage devices for performing such arbitration and to users configured for use in such systems.

BACKGROUND OF THE INVENTION

The following definitions apply throughout the specification, including in the claims:

"SATA standard" denotes the standard known as Serial ATA, Revision 1.0, adopted on Aug. 29, 2001, by the Serial ATA Working Group, for communication between a host and one or more storage devices over one or more serial links;

"SATA system" denotes a system including elements configured for communication over at least one serial link in compliance with the "SATA" standard;

"RAID" system denotes a system including at least one host (e.g., a CPU), at least two storage devices, and a controller coupled between the host and the storage devices to provide an interface between the host and the storage devices. Thus, the expression "RAID" system is used herein more broadly than in a conventional sense in which it denotes a system including at least one host, a "redundant array of inexpensive disks" (an array of inexpensive disk drives), and a controller coupled between the host and disk drives to provide an interface between the host and disk drives; and "user" denotes a system or device configured to interface with a storage device, including by sending device access requests to the storage device, receiving data read from the storage device, and optionally also sending data to the storage device (to be written to the storage device). One example of a user is a disk drive controller.

Conventional multi-port disk drives have special logic (typically included in the port logic) that provides the functionality needed to manage the conventional access capabilities of the ports. However, until the present invention, such special logic had not been implemented to arbitrate among multiple users, coupled via serial links to a multi-port disk drive, and competing for access to the drive, without the need for communication between the users or knowledge by the users of the activities of the other users. Some conventional disk controllers are configured to communicate with each other (e.g., to accomplish failover, whereby one controller assumes responsibility for operations that had been performed by another controller when the latter controller fails). However, the inventors have recognized that it is undesirable to rely on communication among disk controllers to implement arbitration among the controllers as they compete for access to a multi-port disk drive, or to rely on communication between the drive and an unsuccessfully bidding controller after grant of a bid or during performance of a device access by the successfully bidding controller, since to do so would require each controller coupled to the drive to be compatible with all the other controllers coupled to the drive and/or would not eliminate all risk that failure of one controller could interfere with a device access operation by another controller.

The inventors have recognized that it would be advantageous to implement a RAID system (e.g., one including a multi-port storage device shared by multiple controllers) to provide arbitration capability (including selection lockout capability) at the level of a shared multi-port storage device, in a manner assuring that a faulty controller will not interfere with a device access operation in progress.

SUMMARY OF THE INVENTION

In a class of embodiments, the invention is a system including at least one multi-port storage device and at least two users (e.g., disk controllers), each user coupled to a port of the storage device by a serial link. The storage device has an operational portion and a port interface (including arbitration circuitry) between its ports and the operational portion. The storage device can be a read-only device configured to perform only read operations, but more typically is a multi-port disk drive or other multi-port device configured to perform either read or write operations.

Each user is configured to contend for access to the storage device by sending a priority bid to the port to which the user is coupled. In response to each priority bid or set of competing bids, the arbitration circuitry grants one bid (including by sending an acknowledgement, sometimes referred to herein as a "select" acknowledgement, to the successful bidder) and preferably holds each non-granted competing bid (i.e., continues to treat each non-granted competing bid as an active bid) without sending any notification to any unsuccessful bidder until the access by the successful bidder is complete and the successful bidder sends a "deselect" signal to the storage device. In response to the deselect signal, the storage device preferably sends a "deselect" acknowledgement to the originally successful bidder and grants another active bid (including by sending a select acknowledgement to the newly successful bidder). Alternatively, the arbitration circuitry sends a notification (e.g., a "NAK" or "negative acknowledgement" signal) to each unsuccessful bidder upon granting one bid.

Each priority bid and each deselect signal can be either a primitive code (which can be a sequence of code words) or a command. A priority bid can be a "select" command or primitive code, and a "deselect" signal can be a "deselect" command or primitive code that is different from a "select" command or primitive code. The term "command" is used herein to denote a signal that requires more extensive decoding and/or other processing by a storage device (in order for the device to respond to the signal) than would be required for the device to respond to a primitive code. For example, a packet of code words can have at least one predetermined location that contains a value, and each such value can be interpreted (by the device that receives the packet) as a command. In some embodiments of the invention, each priority bid is a command determined by a specific value (e.g., bit pattern) in a predetermined location in a full packet of code words, and each deselect signal is a command determined by another specific value in the same predetermined location in such packet. In other embodiments, each priority bid and each deselect signal is a command that is a distinctive full packet of code words.

In some embodiments, the multi-port storage device is a multi-port disk drive. In other embodiments, it is a memory of another type such as a random access memory chip. In some embodiments the storage device is a dual-port storage device. In other embodiments, the storage device has three, four, or more than four ports, each port configured to be coupled via a serial link to a user.

In another class of embodiments, the invention is a RAID system including at least two controllers (which are users) and at least two storage devices, wherein at least one of the storage devices is a multi-port device shared by at least two of the controllers, with each controller coupled to a port of the multi-port device by a serial link. For example, the system can include a first array of disk drives, a second array of disk drives, a first controller coupled to each disk drive of the first array, and a second controller coupled to each disk drive of the second array, wherein at least one of the disk drives is a dual-port drive that belongs to both the first array and the second array, and the dual-port drive has a first port coupled by a serial link to the first controller and a second port coupled to the second controller by another serial link. In each embodiment in this class, each controller is configured to contend for access to the multi-port device by sending a priority bid. In response to each priority bid or set of competing bids, arbitration circuitry in the multi-port device grants one bid and preferably holds each non-granted competing bid (i.e., continues to treat each non-granted competing bid as an active bid) without sending any notification to the unsuccessful bidder until the access by the successful bidder is complete and the successful bidder sends a deselect signal to the storage device. In response to the deselect signal, the storage device preferably sends a "deselect" acknowledgement to the successful bidder and grants another active bid. If only one formerly unsuccessful bidder has an active bid when a deselect signal is sent to the storage device, the arbitration circuitry grants this bid and sends the newly successful bidder a select acknowledgement. If two or more formerly unsuccessful bidders have active bids when a deselect signal is sent to the storage device, the arbitration circuitry grants one of these active bids and sends a select acknowledgement to the newly successful bidder.

Another aspect of the invention is a multi-port storage device having an operational portion and a port interface (including arbitration circuitry) between the ports and the operational portion. The port interface is implemented so that when the storage device's ports are coupled by serial links to users (each configured to contend for access to the storage device by sending a priority bid over one of the serial links), the resulting system is an embodiment of the inventive system.

Another aspect of the invention is a user configured to contend for access to a multi-port storage device by sending a priority bid to a port of the storage device, when coupled to the port by a serial link. Preferably, the priority bid is a primitive code consisting of an initial control character (e.g., a 10-bit SATA K28.5 or K28.3 control character) followed by two or more distinctive data characters (e.g., three 10-bit data characters, where each data character is a SATA code word that is neither a K28.5 nor a K28.3 control character). Alternatively, the priority bid is a command. The command can consist of a packet of code words, or it can consist of a specific value in a predetermined location within a packet of code words.

DETAILED DESCRIPTION OF THE PREFERRED EMBODIMENTS

The invention allows shared access to a multi-port storage device by multiple users (e.g., memory controllers or disk controllers), where each user is coupled to a different port of the storage device by a serial link. For example, in a RAID system including at least two hosts, at least two storage devices (including at least one multi-port storage device), and a controller coupled between each host and at least two of the storage devices, two controllers can share a multi-port storage device in accordance with the invention. In such a RAID system, each controller sharing the multi-port device would typically also be coupled to at least one other one of the storage devices.

Figure 1:
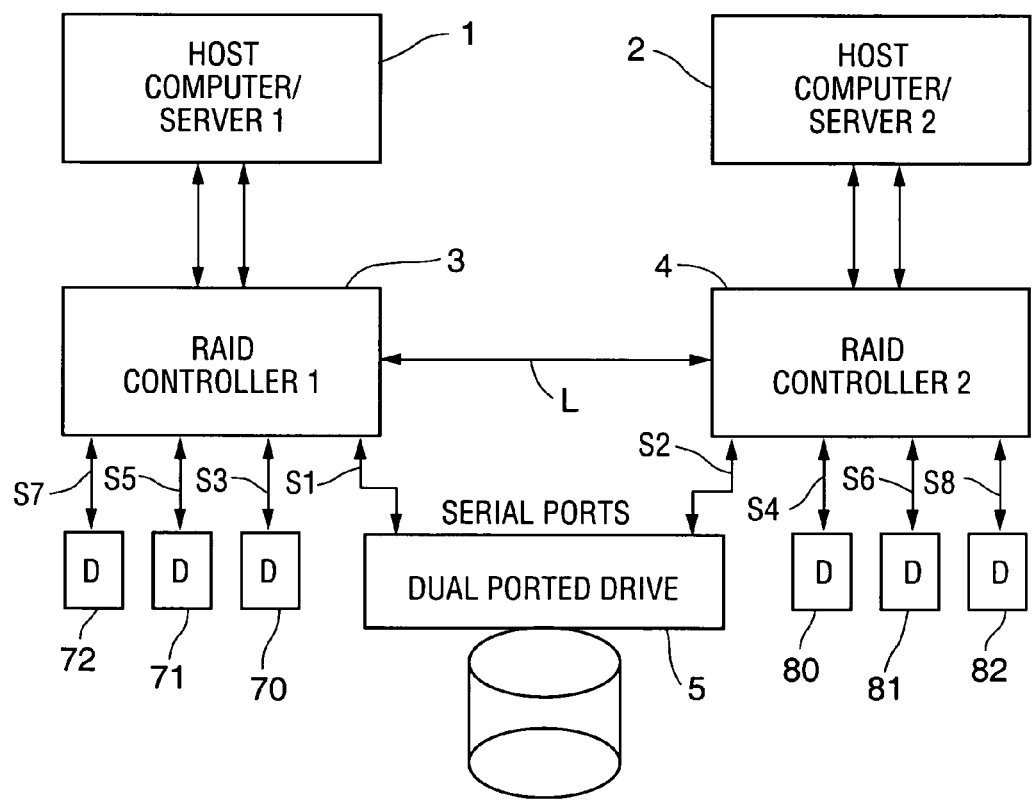
FIG. 1 is a block diagram of a system that embodies the invention.

An example of such a system is the RAID system to be described with reference to FIG. 1. In FIG. 1, controller 3 is coupled between host computer 1 and a first array of storage devices (including dual-ported disk drive 5 and disk drives 70, 71, and 72), and controller 4 is coupled between host computer 2 and a second array of storage devices (including dual-ported disk drive 5 and disk drives 80, 81, and 82). Controllers 3 and 4 share access to disk drive 5, with controller 3 coupled by serial link S1 to one port of drive 5, and controller 4 coupled by serial link S2 to the other port of drive 5. Controller 3 is also coupled to storage devices 70, 71, and 72 of the first array by serial links S3, S5, and S7, respectively, and controller 4 is also coupled to storage devices 80, 81, and 82 of the second array by serial links S4, S6, and S8, respectively. Each of controllers 3 and 4 can bid for the services of device 5. Arbitration circuitry within disk drive 5 handles conflicts that may arise between controllers 3 and 4 when they seek access to drive 5 at the same time (or in the same time interval). The arbitration requires no communication between controllers 3 and 4 and requires no knowledge by either of controllers 3 and 4 of what the other controller is trying to do.

In some implementations of the FIG. 1 system, controllers 3 and 4 are configured to communicate with each other via link L, for example to accomplish a failover. However, no communication between controllers 3 and 4 over link L (or otherwise) is required for the arbitration circuitry within disk drive 5 to accomplish arbitration between controllers 3 and 4 as they compete for access to drive 5.

In a class of preferred ("SATA-compliant") embodiments of the invention, communication between a multi-port storage device and each user coupled thereto (by a serial link) in accordance with the invention is in compliance with the above-mentioned SATA standard. The SATA standard does not address arbitration of the type implemented by the invention. Thus, the arbitration capability of SATA-compliant embodiments is a capability in addition to those required by SATA (a "superset" capability) that does not interfere with or prevent normal SATA operations from progressing.

In other embodiments, communication in accordance with the invention between a multi-port storage device and each user coupled thereto (by a serial link) is in compliance with another standard (for example, the proposed Serial Attached SCSI standard or the Fibre Channel standard) or is not in compliance with any existing standard.

With reference to FIG. 1, controller 3 seeks access to drive 5 by sending a priority bid over link S1 (and controller 4 seeks access to drive 5 by sending a priority bid over link S2) without communicating with any other controller. The priority bid can be a command (sometimes referred to herein as a "select" command) or a primitive code (sometimes referred to herein as a "select" code). In SATA-compliant implementations of the FIG. 1 system, each priority bid (and also each below-discussed "deselect" signal) is preferably a primitive code consisting of an ordered sequence of four 10-bit code words in SATA format (e.g., a 10-bit SATA control character, followed by three specific 10-bit data characters) or predetermined number of repetitions of such a primitive code. Use of a primitive code to denote a priority bid (or deselect signal) is not part of the existing SATA standard and is instead an element of the above-mentioned superset capability provided in accordance with the invention. The SATA standard defines only a small number of primitive codes for use as control codes: each a sequence of four 10-bit code words commencing with the 10-bit control character known as K28.5 or K28.3. Each primitive code employed in accordance with the present invention to indicate a priority bid (or deselect signal) in a SATA system preferably has proper SATA format but is a primitive code (preferably commencing with a K28.5 control character or K28.3 control character) other than any of the primitives defined by the existing SATA standard. In response to receiving a priority bid at one of its ports, device 5 enters a priority selection state. In the priority selection state, circuitry in device 5 asserts a selection request (for device access via the port) to arbitration logic in device 5 (e.g., logic 16 of FIG. 2).

The expressions "primitive code" and "primitive code word" are used synonymously herein, and each can denote a single X-bit code word (e.g., a 10-bit code word denoting an 8-bit input value) or an ordered sequence of code words (e.g., an ordered sequence of four 10-bit code words).

In some embodiments of the invention, each priority bid from controller 3 or 4 is a special, vendor-unique command. In response to receiving such command at one of its ports, device 5 enters a priority selection state. In the priority selection state, circuitry in device 5 asserts a selection request (for device access via the port) to arbitration logic in device 5 (e.g., logic 16 of FIG. 2).

Regardless of the format of the priority bid, when arbitration logic in device 5 grants a selection request, circuitry in device 5 generates an acknowledgement and sends the acknowledgement back to the requesting controller to indicate that the controller's priority bid is successful. When the controller receives the acknowledgement, it knows it has unrestricted access to device 5 and proceeds to accomplish a device access in a normal manner via the port (e.g., as defined by the SATA standard specification). In SATA-compliant implementations of the FIG. 1 system, the acknowledgement signal sent back to the controller will be a new primitive or command that is not called out in the existing SATA standard specification.

If both controllers 3 and 4 send priority bids at the same time to device 5, the arbitration logic in device 5 will respond by granting access to one controller only and device 5 will send an acknowledgement only to the controller whose priority bid is successful. Preferably, device 5 does not respond to the unsuccessful controller, and the unsuccessful controller enters a state in which it waits for a response from device 5 (at least for a predetermined maximum time) without deasserting or otherwise withdrawing its priority bid. When the successful controller completes its granted device access, it asserts a "deselect" signal to device 5 (e.g., a "deselect" command or primitive code). In response, device 5 drops the successful controller's priority bid (in the sense that device 5 enters a state in which it can grant a priority from another controller). A deselect signal can be a command or primitive code that is different from the command or primitive code that determines a priority bid. Upon dropping a successful controller's bid in response to a deselect signal: device 5 preferably asserts a deselect acknowledgement to the successful controller to indicate that the controller must assert another priority bid if the controller wishes to access device 5 again; and device 5 grants a priority bid that is being asserted by another, previously unsuccessful controller (if any such priority bid is being asserted) and device 5 sends an acknowledgement to the previously unsuccessful controller (indicating that its priority bid has now been granted). When the previously unsuccessful controller receives the latter acknowledgement, it knows that it now has access to device 5 and it proceeds to accomplish a device access in a normal manner (e.g., as defined by the SATA standard specification) via the port to which it is coupled.

Multi-port storage devices other than disk drives can embody the invention. For example, variations on the FIG. 1 system include a dual-port random access memory (or another dual-port storage device that is not a disk drive) in place of dual-port disk drive 5

Figure 2:
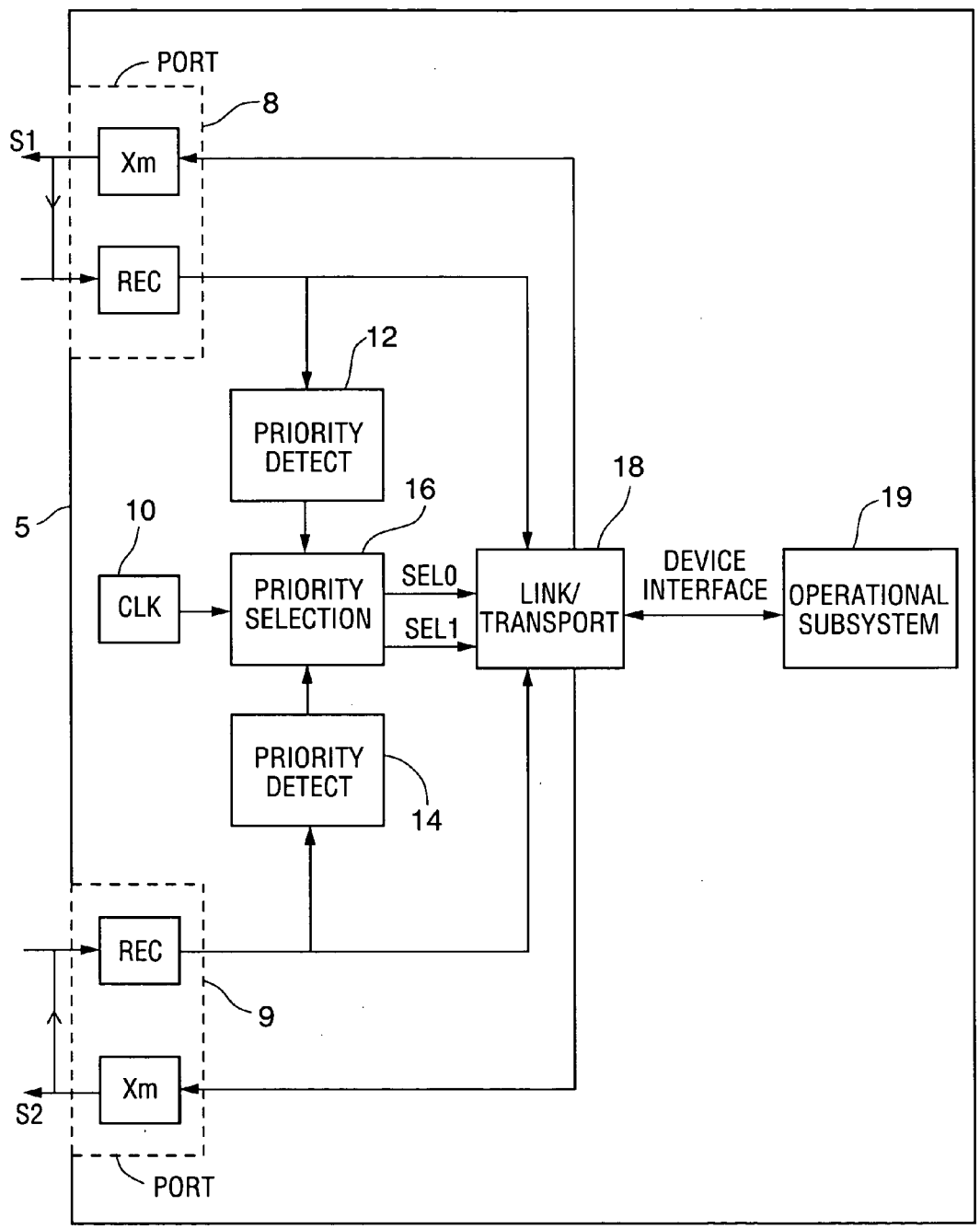
FIG. 2 is a block diagram of an embodiment of dual-port storage device 5 of FIG. 1.

FIG. 2 is a block diagram of an embodiment of dual-port disk drive 5 of FIG. 1. Device 5 of FIG. 2 has two ports (8 and 9), logic configured to respond to each priority bid (which can be either a command or a "primitive code) asserted by controller 3 to port 8 or by controller 4 to port 9, clock 10, and operational subsystem 19, connected as shown. Subsystem 19 includes conventional components (including disks, read/write heads, head actuator, etc.) for performing conventional disk drive operations. The components of device 5 other than subsystem 19 comprise an embodiment of the inventive arbitration circuitry.

The arbitration circuitry of FIG. 2 grants priority to competing controllers on a rotating basis (e.g., first to controller 3 coupled to port 8, then to controller 4 coupled to port 9, then to controller 3, and so on), since it is typically simpler to implement circuitry for granting priority on this basis than on another basis. Other embodiments of the invention grant priority to competing users other than on a rotating basis. Since the FIG. 2 device includes only two ports, rotational latency is not an issue. However, rotational latency must be addressed in some other embodiments of the invention.

Port 8 includes receiver circuitry ("Rec") for receiving data from serial link S1 and transmitter circuitry ("Xm") for transmitting data over serial link S1 to controller 3. Port 9 includes receiver circuitry ("Rec") for receiving data from serial link S2 and transmitter circuitry ("Xm") for transmitting data over serial link S2 to controller 4. Preferably, link/transport logic 18 prevents the transfer of data between operational subsystem 19 and any of the ports until a priority bid has been identified and granted. Whenever port 8 is enabled (even when no priority bid has been granted), data from controller 3 (including any priority bid that has been asserted by controller 3) passes through port 8 to priority bid detection logic 12. Whenever port 9 is enabled (even when no priority bid has been granted), data from controller 4 (including any priority bid that has been asserted by controller 4) passes through port 9 to priority bid detection logic 14. Detection logic 12 (identical to detection logic 14) is configured to monitor the incoming data stream from the receiver (of the port to which it is coupled) and to assert a request signal to priority selection logic 16 in response to identifying a priority bid in this data stream.

Although the expression "priority bid detection logic" is used herein to denote each of elements 12 and 14, each of these elements is typically also configured to detect "deselect" signals as well as priority bids.

Although it is typically feasible to implement logic 12 (and 14) to identify a priority bid (or deselect signal) by identifying a special vendor-unique command (indicative of the priority bid or deselect signal), it is typically preferable to implement logic 12 (and 14) to identify a priority bid (or deselect signal) by identifying a primitive code (e.g., an ordered sequence of four 10-bit code words). In order to simplify the implementation of controllers 3 and 4 it is typically also preferable to implement logic 18 to assert acknowledgements to the transmitter of port 8 (or 9) as primitive codes rather than as vendor-unique commands. Use of primitive codes rather than commands is usually preferred since it offers a savings in the number of gates required to perform the inventive functions. For example, where device 5 of FIG. 2 is implemented to communicate with controllers 3 and 4 in a manner that complies with the SATA standard, a vendor-unique command would typically be determined by some distinctive bit pattern in a predetermined position within a distinctive packet (or frame) of words, or by an entire distinctive "command" packet (or frame), where each word in the packet has SATA format (FIS structure). The same bit pattern (of bits within the packet, or of the entire set of bits comprising the packet) could also be used in a large number of other contexts, and thus device 5 would need to distinguish the relevant "command" pattern from all other patterns likely to be transmitted to its ports. Evaluating all the characters in a packet typically requires more logic than looking for a simple "primitive code" structure. Although primitive codes are used to indicate priority bids, "deselect" signals, and acknowledgements in preferred embodiments, command packets (or "command" bit patterns in predetermined positions within distinctive packets) are used for these purposes in other embodiments.

For example, some implementations of device 5 receive packets of SATA code words, with each packet of a distinctive type having at least one predetermined location that contains a distinctive value. Each such value is interpreted by device 5 as a command. Each priority bid is a command determined by a specific value in a predetermined location in one such packet, and each deselect signal is a command determined by another specific value in the same predetermined location in such packet. Logic in device 5 would be required to identify each such distinctive packet and look at the relevant location in each packet to determine what action to take. As packets transmitted over serial links are typically well defined in their structure, it would typically be easy to implement such logic.

For example, in a SATA system, a packet is sent with a SOF (Start of frame) primitive code followed by a FIS (frame information structure) primitive code. The first byte of the FIS primitive code indicates what type of FIS is being sent. In accordance with the present invention, the next three bytes of the FIS could indicate a priority bid command or a deselect command. The priority logic activated by each such command could activate the appropriate port sequence to cause delivery of a Select Acknowledgement when appropriate.

In contrast, in embodiments of the invention in which each priority bid deselect signal is indicated by a primitive code (rather than a command), device 5 is implemented to identify each such primitive code regardless of the context in which it is received (e.g., regardless of whether or not it is received in a specific, predetermined location within a packet). In SATA systems, a primitive code is defined as a specific control character followed by three specific data characters. In accordance with the invention, a primitive code that indicates a priority bid can have the same control character as a primitive code that indicates a deselect signal, if the data character portion of one such primitive code differs from the data character portion of the other. Alternatively, the two primitive codes can have different control characters. Typically, less hardware is required to distinguish two primitive codes (one indicative of a priority bid; the other indicative of a deselect signal) if they share a common initial control character and are distinguished from each other by having different data character portions, than to distinguish two primitive codes (one indicative of a priority bid; the other indicative of a deselect signal) in either the case that the control character of one differs from the control character of the other. In some implementations, the common initial control character of two primitive codes (one indicative of a priority bid; the other indicative of a deselect signal) is also used in other primitive codes. In other implementations, the common initial control character of two primitive codes (one indicative of a priority bid; the other indicative of a deselect signal) is not used in any other primitive code.

At least one data character in each primitive code can be (or contain) the address of a user.

For example, in one SATA system that embodies the invention: the primitive code K28.3 followed by D10.2, D10.3, and D10.4 (where each of D10.2, D10.3, and D10.4 is a 10-bit data character) indicates a priority bid; and the primitive code K28.3 followed by D21.5, D21.5, and D21.5 (three repetitions of the 10-bit data character D21.5) indicates a deselect signal. In this example, the port logic in device 5 would look for the control character K28.3. In response to identifying a control character K28.3, the logic would determine whether the next three data characters match the sequence D10.2, D10.3, and D10.4 or the sequence D21.5, D21.5, and D21.5. If a match is identified, the logic would respond accordingly. Only one control character would need to be decoded. Only a simple state machine would be required since it would only need to look for the "Select" primitive when a "Deselect" primitive has been identified, and would only need to look for the "Deselect" primitive when a "Select" primitive has been identified.

For another example, in another SATA system that embodies the invention: the primitive code K28.3 followed by Dxx.y, Dxx.y, and Dxx.y (where Dxx.y is a 10-bit data character) indicates a priority bid; and the primitive code K28.y followed by Dxx.y, Dxx.y, and Dxx.y indicates a deselect signal.

Preferably, device 5 of FIG. 2 is implemented to communicate with controllers 3 and 4 in a manner that complies with the SATA standard, each priority bid asserted by controller 3 or 4 is a predetermined, ordered sequence of 10-bit code words in SATA format. For example, the sequence can consist of four 10-bit SATA codes or it can consist of a predetermined number of repetitions of such a sequence of four 10-bit SATA codes. In one preferred embodiment, the primitive code word sequence consists of an initial 10-bit SATA K28.5 (or K28.3) control character followed by three distinctive 10-bit data characters in SATA format, where each data character is a SATA code word that is neither a K28.5 nor a K28.3 control character. Typically, a priority bid would be a 40-bit primitive (consisting of four 10-bit SATA codes), and in a select request sequence, a controller would repeatedly send this primitive until it either received an acknowledgement, or until a timeout occurred (causing the select request sequence to abort). When a K28.5 or K28.3 control character is used, the data characters following the control character should be picked such that the inventive primitive does not match any primitive already defined by the SATA specification.

Selection and deselection can alternatively be triggered using primitives, each primitive having an initial control character other than the K28.5 or K28.3 control character and at least two subsequent data characters.

In response to assertion of a request signal from one or both of logic units 12 and 14, priority selection logic 16 determines which port has priority, and thus determines which priority bid to grant. Once priority has been selected, logic 16 sends a selection signal (i.e., selection bits Sel0 and Sel1, indicative of the selection) to link/transport logic unit 18. In response to the selection signal, logic unit 18 halts handshaking on the inactive (nonselected) port and places device 5 in a state in which can execute the requested device access operation including by transferring data between the successful controller and operational subsystem 19 via the selected port. Link/transport logic unit 18 also causes an acknowledgement (e.g., a special command or control character) to be sent to the successful controller via the selected port (and the serial link coupled thereto) to indicate that the controller's priority bid has been granted.

By dividing the priority bid detection logic (12 and 14) from priority selection logic (16) in the manner shown in FIG. 2, the amount of hardware (including arbitration hardware) required to support dual ports is minimized, and the need for more than one link/transport logic unit (18) to serve ports 8 and 9 is eliminated. Link/transport logic unit 18 can be implemented as a standard link/transport logic block (of the type employed in conventional dual-port disk drives), supplemented with circuitry for asserting each required acknowledgement signal to the appropriate one of ports 8 and 9 at the appropriate time. In view of the present disclosure, it will be apparent to those of ordinary skill in the art how to configure unit 18 to include the required acknowledgement-assertion circuitry.

When both of controllers 3 and 4 have asserted a priority bid and the priority bid of one of them (the "successful" controller) has been granted, the priority bid detection logic (12 or 14) for the unsuccessful controller keeps the unsuccessful controller's bid active (by continuing to assert the corresponding request signal to logic 16) unless and until the unsuccessful control deasserts its bid. If the unsuccessful controller's bid remains active when the successful controller completes its device access and deasserts its bid (e.g., by sending a deselect command or primitive to device 5), the priority bid detection logic for the successful controller responds by deasserting the request signal that it had been asserting to priority selection logic 16. In response, logic 16 grants the formerly unsuccessful controller's bid (by inverting each of the selection bits Sel0 and Sel1 that it had been asserting to link/transport logic 18). In response to the new values of the selection bits, logic 18 causes an acknowledgement to be sent to the newly successful controller and (in some implementations) causes a deselect acknowledgement to be sent to the other controller, and device 5 enters a state in which it is ready to perform a device access operation specified by the newly successful controller. Device 5 serves the newly successful controller until deselection occurs. The other (formerly successful) controller must wait until the newly successful controller relinquishes port control by sending a deselect signal to device 5.

Only one of the selection bits (Sel0 or Sel1) asserted by logic 16 to unit 18 is active at any time (unless an error condition exists). If an unsuccessful controller deasserts its priority bid (causing logic 12 or 14 to cease asserting a bid from such controller), logic 16 does not invert either of the selection bits (Sel0 or Sel1) in response. An unselected user can periodically assert a burst of priority bids, and if no response is received within a short time, it can then postpone further assertion of priority bids.

If a successful controller (controller "A," whose priority bid has been granted) sends a deselect signal to device 5 while an unsuccessful controller (controller B) has an active priority bid, unit 18 preferably completes its response to the deselect signal (including by sending to controller A any deselect acknowledgement to be sent) before enabling the port to which controller B is coupled and sending an acknowledgement to controller B.

Figure 3:
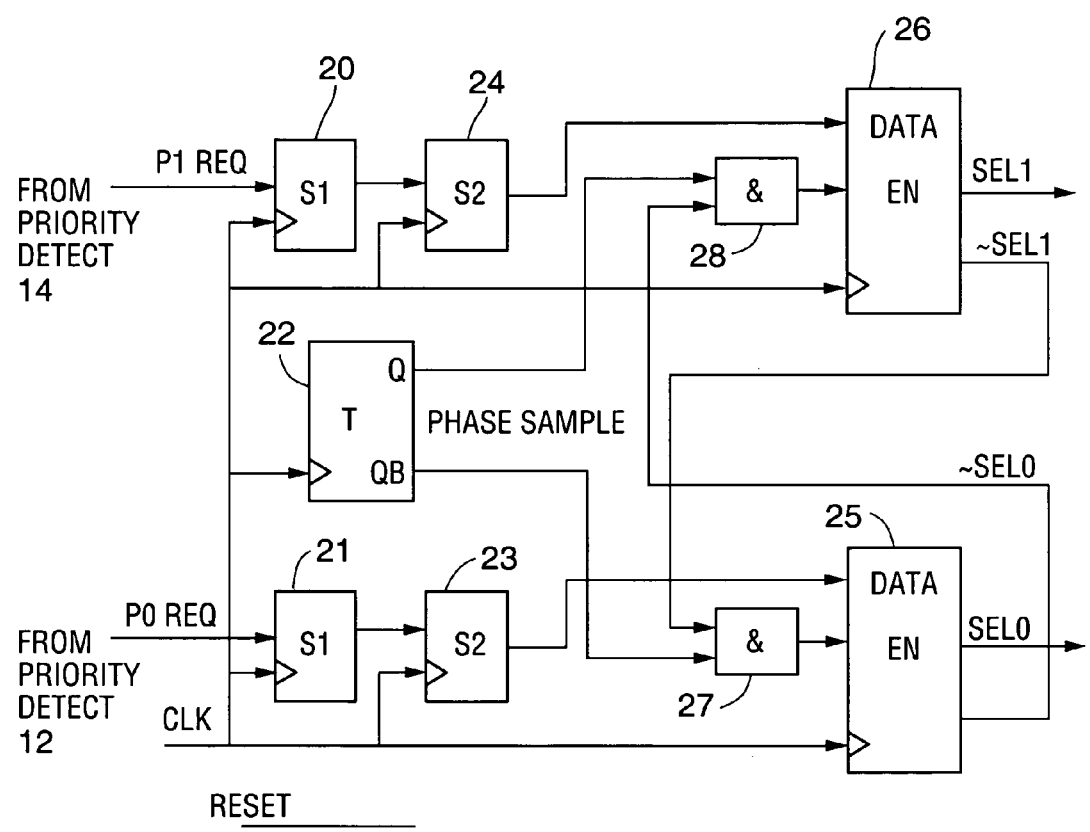
FIG. 3 is a block diagram of an embodiment of priority selection logic 16 of FIG. 2.

If both controllers assert a priority bid at the same time (i.e., one within a predetermined time interval of the other), the design of priority selection logic 16 determines which priority bid will be granted. It can occur that the clock phase on which each priority bid occurs determines which priority bid is granted. While there are several common ways to accomplish priority selection, the simplest for dual port arbitration is to sample one and then the other port in sequential order, granting access to the controller for which a priority bid is first seen in a sample period. FIG. 3 is an embodiment of priority selection logic 16 of FIG. 2 that accomplishes priority selection in such a simple manner.

The FIG. 3 implementation of priority selection logic 16 employs alternating clock sampling methodology. The incoming request signals from logic units 12 and 14 ("P0 Req" from unit 12 and "P1 Req" from unit 14) are synchronized in flip-flops 20, 21, 23, and 24, in response to the clock signal "CLK" from clock 10, and the synchronized request signals are applied to priority select registers 25 and 26. Assertion of request signals that are fully synchronous with the clock to registers 25 and 26 eliminates metastability problems in the "select" outputs (the "Sel0" and Sel1" bits) of the registers.

Toggle type flip-flop 22 receives the CLK signal (having frequency "f") and asserts in response two half clock speed-sampling signals (each having frequency "f/2"). The half clock speed-sampling signal ("Phase Sample") asserted at the Q output of flip-flop 22 is asserted to an input of AND gate 28.

The inverse of this half clock speed-sampling signal (asserted at the QB output of flip-flop 22) is asserted to an input of AND gate 27. This allows the request signal from one port to be sampled out of phase (on alternating clock cycles) with the request signal from the other port; not at the same time. The alternating sampling technique assures that only one controller is granted access at a time. It also allows the selection of one controller (by asserting the bit "Sel0" with logical value "1" to select controller 3 or asserting the bit "Sel1" with logical value "1" to select controller 4) to block the selection of the other controller (by assertion of the complement, "~Sel0" or "~Sel1," of the selection bit for the successful controller from the relevant one of registers 25 and 26 to the relevant one of AND gates 27 and 28). For example, when the bit "Sel0" goes high to select controller 3 (in response to assertion of logical ones at the outputs of flip-flop 23 and AND gate 27 in the same clock cycle), the bit "~Sel0" goes low, thus forcing the output of AND gate 28 low. Since the output of AND gate 28 is coupled to the enable input of register 26, the output of register 26 ("Sel1") is forced low until the bit "~Sel0" goes high, which can occur only after the output of flip-flop 23 goes low in response to detection (by logic 12) of a deselect signal from controller 3.

When a selected (successful) controller sends a deselect signal to device 5, the corresponding one of the request signals "P0 Req" and "P1 Req" from logic unit 12 or 14 goes low, causing each output of the corresponding select register (25 or 26) to switch states.

When select register 25 toggles to "off" (i.e., "Sel0" undergoes a high-to-low transition), link/transport logic 18 responds to the transition of "Sel0" by performing or triggering all actions required to deselect controller 3 and then enabling port 9. If logic 14 is maintaining (as an active bid) a bid from controller 4 (so that "P1 Req" is high) when register 25 toggles to "off," the FIG. 3 circuitry responds to the high-to-low transition of "Sel0" by causing a low-to-high transition of register 26's output bit "Sel1" during the next sampling period (i.e., as of the next low-to-high transition of the "Q" output of flip-flop 22). If "P1 Req" is low (i.e., logic 14 had not been maintaining an active bid from controller 4) when register 25 toggles to "off," then logic 18 enables port 9 and allows port 8 to remain enabled in response to the high-to-low transition of "Sel0," and the FIG. 3 circuitry responds to the high-to-low transition of "Sel0" by entering a state in which both controllers can compete for access to device 5 (the bit "Sel1" output from select register 26 can go high during the next sampling period in which "P1 Req" and flip-flop 22's Q output are high if this occurs before a sampling period in which "P0 Req" and flip-flop 22's QB output are high, and bit "Sel0" output from select register 25 can go high during the next sampling period in which "P0 Req" and flip-flop 22's QB output are high if this occurs before a sampling period in which "P1 Req" and flip-flop 22's Q output are high). In response to each low-to-high transition of bit "Sel1," logic 18 performs or triggers all actions required to send an acknowledgement to newly successful controller 4, and logic 18 also disables port 8 (port 8 is disabled and port 9 enabled after a deselect acknowledgement is sent to controller 3, in implementations in which a deselect acknowledgement is sent in response to each deselect signal).

When select register 26 toggles to "off" (i.e., "Sel1" undergoes a high-to-low transition), logic 18 responds to the transition of "Sel1" by performing or triggering all actions required to deselect controller 4 and then enabling port 8. If logic 12 is maintaining (as an active bid) a bid from controller 3 (so that "P0 Req" is high) when register 26 toggles to "off," the FIG. 3 circuitry responds to the high-to-low transition of "Sel1" by causing the bit "Sel0" output from select register 25 to go high during the next sampling period (i.e., as of the next low-to-high transition of the "QB" output of flip-flop 22). If "P0 Req" is low (i.e., logic 12 had not been maintaining an active bid from controller 3) when select register 26 toggles to "off," then logic 18 enables port 8 and allows port 9 to remain enabled in response to the high-to-low transition of "Sel1," and the FIG. 3 circuitry responds to the high-to-low transition of "Sel1" by entering a state in which both controllers can compete for access to device 5 (the bit "Sel1" output from select register 26 can go high during the next sampling period in which "P1 Req" and the Q output of flip-flop 22 are high if this occurs before a sampling period in which "P0 Req" and the QB output of flip-flop 22 are high, and bit "Sel0" output from select register 25 can go high during the next sampling period in which "P0 Req" and the QB output of flip-flop 22 are high if this occurs before a sampling period in which "P1 Req" and the Q output of flip-flop 22 are high). In response to each low-to-high transition of bit "Sel0," logic 18 performs or triggers all actions required to send an acknowledgement to newly successful controller 3, and logic 18 also disables port 9 (port 9 is disabled and port 8 enabled after a deselect acknowledgement is sent to controller 4, in implementations in which a deselect acknowledgement is sent in response to each deselect signal).

The FIG. 3 implementation of priority selection logic 16 can easily be modified (i.e., expanded) for use in a storage device having more than two ports (each identical to port 8 or 9), where a controller is coupled via a serial link to each port. Such a modified version of the FIG. 3 circuit would be a sequential-phase clock sampling circuit (employing a set of sampling signals for sequentially sampling the request signals for all the ports with equal phase delay between consecutive sampling events), rather than a phase alternating clock sampling circuit as in FIG. 3 (which employs two sampling signals for alternately sampling the request signals for ports 8 and 9 with equal phase delay between consecutive sampling events). The ability to support as many storage device ports as desired can easily be implemented by obvious expansions of the descriptions herein of two-port embodiments. For example, in priority selection logic for use in a three-port storage device, flip-flop 22 would be replaced by a logic circuit that receives the CLK signal (having frequency "f") and asserts in response three "one-third-speed" sampling signals (each having frequency "f/3"), and the priority selection logic would assert each sampling signal to an input of a different AND gate.

Figure 4:
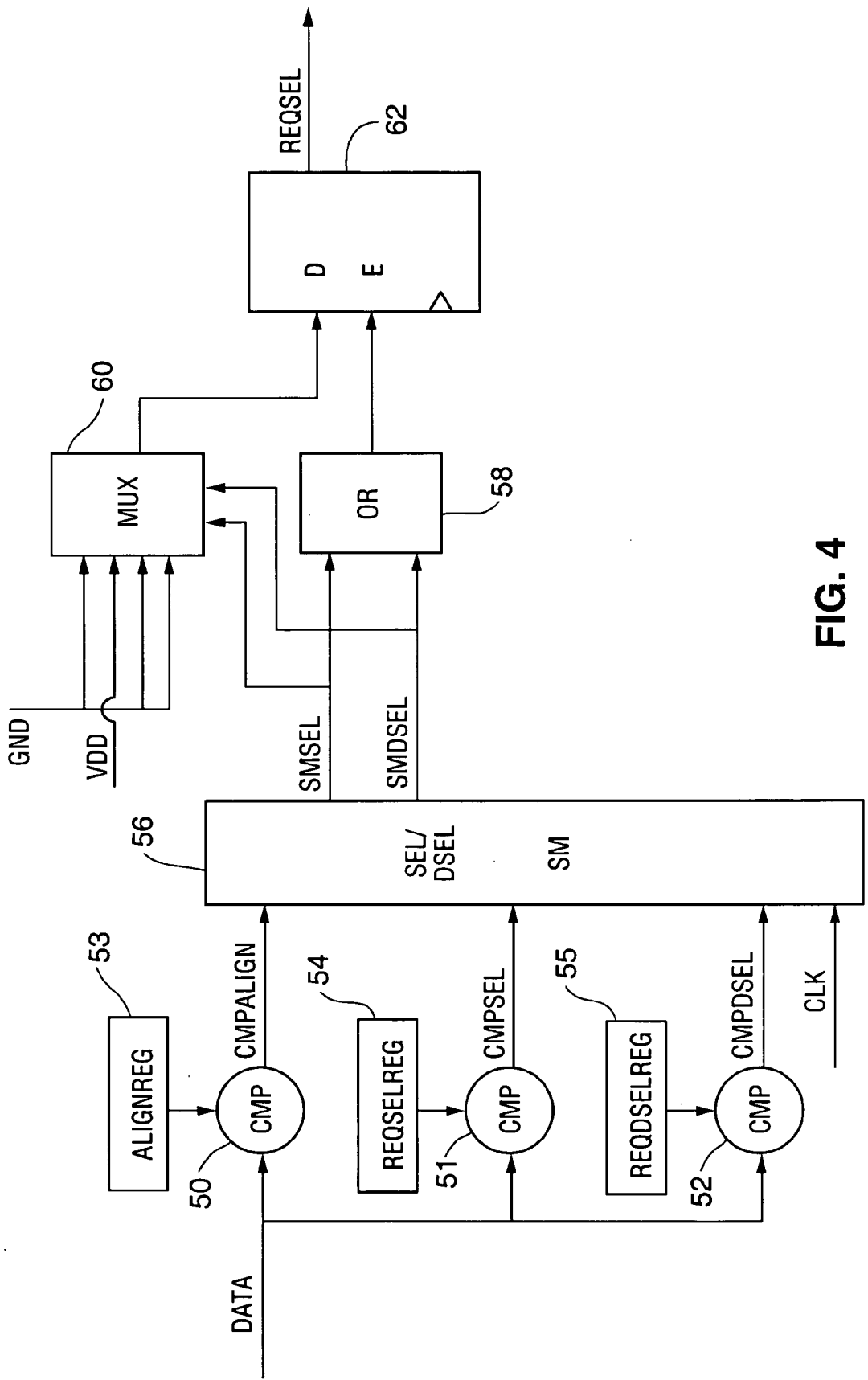
FIG. 4 is a block diagram of an embodiment of priority detect logic 12 (or 14) of FIG. 2.

FIG. 4 is an implementation of priority bid detection logic 12 of FIG. 2. The FIG. 4 circuit includes comparators 50, 51, and 52, each having a first input that is coupled to the receiver of port 8 during operation of the FIG. 4 circuit, registers 53, 54, and 55 (coupled, respectively, to second inputs of comparators 50, 51, and 52), and state machine 56 (coupled to the output of each of comparators 50, 51, and 52. Logic 14 is preferably implemented to be identical to logic 12, but with the first input of each of comparators 50, 51, and 52 of a FIG. 4 implementation of logic 14 being coupled to the receiver of port 9 during operation. The functionality of state machine 56 will be described with reference to the state diagram of FIG. 5.

Figure 5:
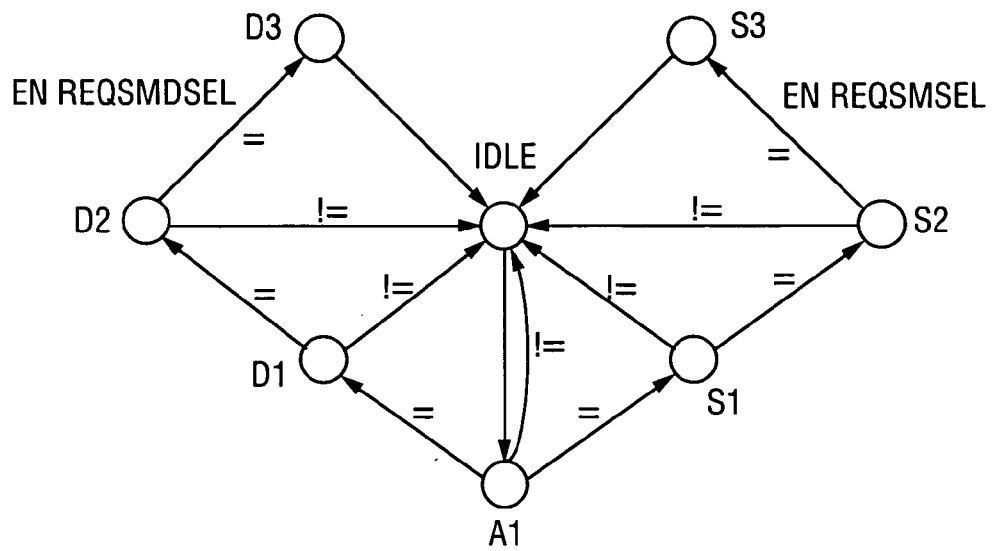
FIG. 5 is a state diagram of state machine 56 of FIG. 4.

FIGS. 4 and 5 contemplate that each priority bid is a sequence of four code words: an initial 10-bit SATA control character immediately followed by three 10-bit code words (to be referred to as a "select" code). FIGS. 4 and 5 also contemplate that each deselect signal is a sequence of four code words: an initial 10-bit SATA control character immediately followed by three 10-bit code words (to be referred to as a "deselect" code). The bits of each select code and each deselect code are transmitted serially to port 8 or 9 of device 5. One or both of the select code and the deselect code can consist of three identical code words following an initial control character, or each of the select and deselect codes can consist of three non-identical code words (three code words including at least two different words) following an initial control character. The select code and deselect code are distinctive sequences of four 10-bit code words, each consisting of an initial control character (e.g., the K28.5 or K28.3 control characters defined by the SATA standard or some other control character defined by an extension of the SATA standard) followed by a distinctive set of three 10-bit SATA data characters.

The select code can be an initial control character (e.g., K28.5 or K28.3, or some other control character) followed by three SATA data characters (that determine a first bit pattern), and the deselect code can be the same initial control character followed by three SATA data characters (that determine a second bit pattern). In this case, register 53 stores the 10-bit initial control character, register 54 stores the 30-bit "first bit pattern," and register 55 stores the 30-bit "second bit pattern."

In some cases, the select code can be an initial control character (e.g., K28.5 or K28.3 or some other control character) followed by three repetitions of a first SATA data character, and the deselect code can be the same initial control character followed by three repetitions of a second SATA data character. In such cases, register 53 stores the 10-bit initial control character, register 54 stores the 10-bit "first SATA data character," and register 55 stores the 10-bit "second SATA data character."

Repetition of data characters in the select (or deselect) code may save hardware in implementing the invention but is not an essential aspect of the invention. It is contemplated that there will not be repetition of data characters in either the select code or the deselect code. Likely, the K28.5 control character would not be used in a select or deselect code, since this is control character is used in SATA-compliant systems for other critical functions. Thus, it is contemplated that it will be preferred (in SATA-compliant implementations of the invention) that the initial control character of each select code and deselect code be the K28.3 control character, or some other control character defined by an extension of the SATA standard.

Figure 6:
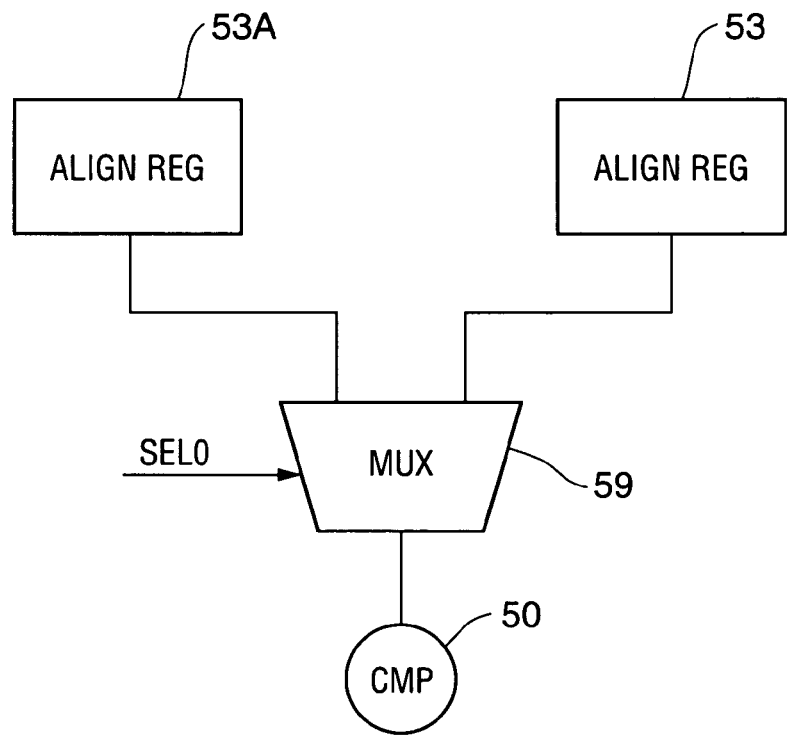
FIG. 6 is a block diagram of logic that replaces elements 50 and 53 in a variation on the FIG. 4 embodiment.

In the case that the select code and deselect code have different initial 10-bit code words, some embodiments of the invention would employ the FIG. 6 circuitry in place of comparator 50 and register 53 of FIG. 4. In this case, the initial 10-bit code of each of the select code and deselect code can be one of 256 possible control characters. For example, one can be a K28.5 control character and the other a K28.3 control character. For specificity, the description of FIG. 6 will assume the latter exemplary embodiment. Thus, as shown in FIG. 6, register 53 would store the K28.5 control character, register 53A would store the K28.3 control character, and multiplexer 59 (coupled between comparator 50 and registers 53 and 53A) would be controlled to connect at the appropriate time (i.e., in each appropriate state) the appropriate one of registers 53 and 53A to comparator 50. Typically, multiplexer 59 would be controlled by the selection bit Sel0, so that comparator 50 would compare the data received at port 8 with the contents of register 53 when a priority bid asserted to port 8 has been granted, and comparator 50 would otherwise compare the data received at port 8 with the contents of register 53A.

With reference to FIG. 4, while logic 12 monitors the data received at port 8, comparator 50 asserts a word "cmpcent" to state machine 56 indicating whether or not a K28.3 or K28.5 control character (or more generally, whether or nor the initial control character of the priority bid and deselect signal) has been received, comparator 51 asserts a word "cmpsel" to state machine 56 indicating whether or not the 30-bit data character bit pattern indicative of a priority bid has been received, and comparator 52 asserts a word "cmpdsel" to state machine 56 indicating whether or not the 30-bit data character bit pattern indicative of a deselect signal has been received.

State machine 56 evaluates the sequence of received values of cmpcnt, cmpsel and cmpdsel to determine when a priority bid or deselect signal has been received. In response to determining that a sequence of four codes indicative of a priority bid has been received at the receiver of port 8, state machine asserts output bit "smsel" with a logical "one" value. In response to determining that a sequence of four codes indicative of a deselect signal has been received at the receiver of port 8, state machine asserts output bit "smdsel" with a logical "one" value.

The two inputs of OR gate 58 are coupled to state machine 56 to receive the output bits "smdsel" and "smsel." The output of OR gate 58 is coupled to the enable input of register 62. Multiplexer 60 has four inputs: three held at a level indicative of a logical "zero" (ground potential) and one held at a level indicative of a logical "one" (supply potential Vdd). The output bits "smdsel" and "smsel" are asserted to the control terminals of multiplexer 60. The output of multiplexer 60 is coupled to the data input of register 62, and is thus used for applying the data to be strobed into register 62 when the clock and enable inputs of register 62 are active.

Thus, register 62 is enabled when at least one of "smdsel" and "smsel" is a logical "1." The output of multiplexer 60 is a logical "1" when "smdsel" is a logical "0" and "smsel" is logical "1." Otherwise, the output of multiplexer 60 is a logical "0." Thus, the request signal (bit "Reqsel") output from register 62 undergoes a low-to-high transition when "smsel" undergoes a low-to-high transition (and "smdsel" is low), and high-to-low transition when "smdsel" undergoes a low-to-high transition. If or some reason both "smsel" and "smdsel" are active at the same time (an illegal state), the output of multiplexer 60 is forced to a logical "0," thus triggering a deselect sequence for the controller that is coupled (via the relevant port) to the input of the priority bid detection logic.

FIG. 5 shows the state diagram for state machine 56 (one of which is included in each of each of logic units 12 and 14). State machine 56 enters an IDLE state (and both ports 8 and 9 are enabled) at power on and state machine 56 remains in the IDLE state until it detects a priority bid or deselect signal. Once the state machine is in the IDLE state, it stays in that state until a control character code (e.g., the relevant K28.3, or Kxy.z control character) is detected by comparator 50. Once a specific control character code is detected, state machine 56 enters state "A1" and waits for the next data character. Once in state A1: if the next data character is consistent with a "select" signal, the state machine branches to state "S1" and waits for a subsequent code word; if the next data character is consistent with a "deselect" signal, the state machine branches to state "D1" and waits for a subsequent code word word; and otherwise the state machine returns to the IDLE state.

From state S1, state machine can complete a select sequence. Once in state S1, if the next code word is consistent with a "select" signal, state machine 56 enters state "S2" and waits for a subsequent code word (otherwise, it returns to the IDLE state). Once in state S2: if the next code word is again consistent with a select signal, state machine 56 enters state "S3" (in which it outputs "smsel" with logical "1" value, forcing the request signal "Reqsel" high and completing the select sequence) and then returns to the IDLE state; and otherwise the state machine returns to the IDLE state without entering state S3. In either of states S1 and S2, if the next code word seen is not consistent with a "select" signal, the state machine jumps back to the IDLE state without completing the select sequence.

The deselect sequence is almost identical to the select sequence. Once in state D1, if the next code word is consistent with a "deselect" signal, state machine 56 enters state "D2" and waits for the next code word (otherwise, it returns to the IDLE state). Once in state D2: if the next code word is again consistent with a deselect signal, state machine 56 enters state "D3" (in which it outputs "smdsel" with logical "1" value, forcing the request signal "Reqsel" low and completing the deselect sequence) and then returns to the IDLE state; and otherwise the state machine returns to the IDLE state without entering state D3. In either of states D1 and D2, if the next code word seen is not consistent with a deselect signal, the state machine jumps back to the IDLE state without completing the deselect sequence.

By requiring detection of three consecutive "select" codes in order to complete a select sequence and three consecutive "deselect" codes in order to complete a deselect sequence, the inventive circuitry is made more robust and it becomes extremely unlikely that a request signal will be inappropriately asserted (to priority selection logic 16) or deasserted as a result of a noise burst (or a partial sequence that may be caused by some error in the controller). This robustness increases the reliability of the inventive system.

It is anticipated that many variations on the described "priority bid" and "deselect" primitives are possible. In the FIG. 4 embodiment, the same control character is used as the initial character of both the priority bid primitive and the deselect primitive. This saves logic gates. However, as noted above, a priority bid primitive can have an initial control character and a deselect primitive can have a different initial control character. In the latter case, the above-described state sequence diagram would be altered and each select and deselect path would be different (they would not both share the "A1" state).

Another embodiment of the invention is a method for arbitrating among bids for access to a multi-port storage device by at least two users, each of the users being coupled to a different port of the storage device by a serial link, said method including the steps of:

(a) sending competing bids from the users over serial links to ports of the storage device;

(b) responding to the competing bids by granting one of said bids, sending a select acknowledgement over one of the links to a first user whose bid has been granted, and holding each non-granted bid without sending any notification of an unsuccessful bid to any of the users;

(c) after step (b), sending a deselect signal from the first user to one of the ports of the storage device; and (d) responding to the deselect signal by sending a deselect acknowledgement to the first user, granting a held bid that had been sent to the storage device by one of the users other than the first user, and sending another select acknowledgement to said one of the users other than the first user.

In preferred embodiments of the method, each of the bids is a primitive code that is a first ordered sequence of code words (e.g., a control character followed by at least two data characters), and the deselect signal is another primitive code that is a second ordered sequence of code words (e.g., a control character followed by a different sequence of at least two data characters). Preferably, the first ordered sequence comprises an initial control character (e.g., a 10-bit, SATA, K28.3 or K28.5 code) followed by at least three 10-bit SATA data characters (e.g., three repetitions of one SATA data character), and the second ordered sequence comprises the same initial control character followed by a different sequence of at least three SATA data characters (e.g., three repetitions of another SATA data character). Alternatively, the first ordered sequence comprises a first initial control character (e.g., a 10-bit K28.3 code) followed by at least three SATA data characters, and the second ordered sequence comprises another initial control character (e.g., a 10-bit K28.5 code) followed by at least three SATA data characters.

Typically, the host repeatedly sends a 40-bit select sequence (or a 40-bit deselect sequence) until the appropriate acknowledgement is returned. The select acknowledgement is preferably constructed in the same manner as is the select sequence (e.g., it comprises an initial 10-bit control character followed by a sequence of at least three data characters), and the deselect acknowledgement preferably is constructed in the same manner as is the deselect sequence. The select acknowledgement and deselect acknowledgement can share the same initial control character or they can have different initial characters.

In preferred embodiments, the inventive multi-port storage device (e.g., device 5 of FIG. 2) is configured to respond to control signals from an external source by enabling or disabling the arbitration circuitry included therein or selected elements of the arbitration circuitry.

For example, the storage device can be configured to respond to a manual override signal by selecting one port and disabling all other ports. Some implementations of the arbitration logic of the invention (e.g., logic 16 of FIG. 2) may be subset to a hardware error that would "hang" the port logic, preventing arbitration logic from performing dynamic port selection in response to priority bids, and disturbing the ability of the storage device to respond to priority bids received at one or more of the ports. In the event of such a hardware error, it would be desirable to switch the storage device into a "static selection" mode by asserting thereto the above-mentioned manual override signal (which will sometimes be referred to herein as a "port enable" signal). The "port enable" signal would be held inactive during normal operation while the arbitration logic determines dynamically which of competing priority bids should be selected. When an error occurs, or when a user chooses to operate the storage device in the static selection mode, the port enable signal is made active and another signal (a "Select01" signal) indicative of which port should be statically selected is asserted to the storage device. The storage device responds to the active "port enable" signal (and the Select01 signal) by selecting one port (e.g., by forcing priority selection logic 16 to assert a selection bit to unit 18 that statically selects the port determined by the Select01 signal) and disabling all other ports (e.g., by forcing priority selection logic 16 to assert one or more selection bits to unit 18 to statically deselect each other port). While the port enable signal is active, the Select01 signal can be changed (e.g., toggled between two values, when the storage device has only two ports) to force selection of a sequence of different ports.

In the "static selection" mode, the storage device preferably responds to device access requests (asserted to the selected port) even if such requests are not preceded by priority bids, and the storage device does not assert acknowledgements in response to priority bids (or device access requests) asserted to the selected port. In the static selection mode, SATA-compliant embodiments of the storage device preferably respond to device access requests at the selected port as would a conventional SATA device without the need to support the superset primitives (described herein) which are used in select and deselect sequences during normal operation (when arbitration logic performs dynamic port selection).

It will be appreciated that embodiments of the invention in which a storage device has both static selection and normal operating modes, the storage device can be operated in the static selection mode when the electronics of an attached controller (or other user) does not fully support the ability to send and receive the primitives (or commands) employed by the invention to indicate priority bids and deselect signals in the normal operating mode. When such a controller is to be used, the static selection mode allows multi-porting to occur in a simple external manner.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:

1. A system, including:
    at least one multi-port storage device including ports, an operational portion, and a port interface coupled between the ports and the operational portion; and
    at least two users, each of the users coupled to a different one of the ports by a serial link and configured to contend for access to the storage device by sending a priority bid to said one of the ports over the link, wherein the storage device is operable in a first mode to respond to a set of competing bids received at at least two of the ports from at least two of the users by granting one of the bids and causing a select acknowledgement to be sent over one said link to the user whose priority bid has been granted,
    wherein the storage device is also operable in a second mode in which the port interface responds to signals received at a selected one of the ports but does not respond to any signal received at any of the other ports, and
    wherein the storage device undergoes a transition from operation in the first mode to operation the second mode in response to a manual override signal and a port select signal, wherein the port select signal is indicative of said selected one of the ports.

* * * * *